United States Patent
Obrist et al.

(10) Patent No.: US 9,666,912 B2
(45) Date of Patent: May 30, 2017

(54) HEAT-EXCHANGER ASSEMBLY

(71) Applicant: Obrist Powertrain GmbH, Lustenau (AT)

(72) Inventors: Frank Obrist, Bregenz (AT); Martin Graz, Lustenau (AT); Peter Giese, Herzogenaurach (DE); Oliver Obrist, Dornbirn (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 179 days.

(21) Appl. No.: 14/099,337

(22) Filed: Dec. 6, 2013

(65) Prior Publication Data
US 2014/0162107 A1 Jun. 12, 2014

(30) Foreign Application Priority Data

Dec. 7, 2012 (EP) .................................... 12196196

(51) Int. Cl.
*H01M 10/613* (2014.01)
*F28F 3/12* (2006.01)
(Continued)

(52) U.S. Cl.
CPC ........... *H01M 10/5004* (2013.01); *F28F 3/12* (2013.01); *F28F 9/026* (2013.01); *H01M 10/613* (2015.04);
(Continued)

(58) Field of Classification Search
None
See application file for complete search history.

(56) References Cited

U.S. PATENT DOCUMENTS

| 5,205,348 A | 4/1993 | Tousignant et al. |
| 2009/0260586 A1* | 10/2009 | Geskes ............... F02B 29/0462 123/41.48 |
| 2009/0297892 A1* | 12/2009 | Ijaz ..................... B23K 26/242 429/7 |

(Continued)

FOREIGN PATENT DOCUMENTS

| DE | 102006059989 | 6/2008 |
| DE | 202007017390 | 4/2009 |

(Continued)

OTHER PUBLICATIONS

European Search Report dated Mar. 25, 2013 for the Corresponding European Patent Application No. EP 12196196.
European Office Action dated Aug. 15, 2013 for the Corresponding European Patent Application No. EP 12196196.
International Search Report dated Apr. 28, 2014 for the Corresponding International Patent Application No. WO PCT/EP2013/075838.

*Primary Examiner* — Patrick Ryan
*Assistant Examiner* — Christopher Domone
(74) *Attorney, Agent, or Firm* — Hassan Abbas Shakir; Katten Muchin Rosenman LLP

(57) ABSTRACT

For a technical object whose temperature is to be controlled, in particular a battery for an electric vehicle drive, there is provided a heat exchanger arrangement, the heat exchanger of which is in the form of a heat-exchanging pouch which has an inflow and outflow duct and which is in heat-conducting contact with internal surfaces of the object whose temperature is to be controlled. The heat-exchanging pouch is produced in a simple manner by means of edge welding of two foil pieces arranged one above the other. The mounting of said heat-exchanging pouch in a narrow gap space of a heat exchanger arrangement, and good heat transfer to adjacent walls, are made possible by means of a pressure pouch which is likewise formed from a foil material and which is filled with a compressible medium.

15 Claims, 3 Drawing Sheets

(51) Int. Cl.
*F28F 9/02* (2006.01)
*H01M 10/625* (2014.01)
*H01M 10/615* (2014.01)
*H01M 10/653* (2014.01)
*H01M 10/6556* (2014.01)
*H01M 10/652* (2014.01)
*H01M 10/6557* (2014.01)
*H01M 10/643* (2014.01)
*H01M 10/617* (2014.01)
*H01M 10/6567* (2014.01)

(52) U.S. Cl.
CPC ....... *H01M 10/615* (2015.04); *H01M 10/617* (2015.04); *H01M 10/625* (2015.04); *H01M 10/643* (2015.04); *H01M 10/652* (2015.04); *H01M 10/653* (2015.04); *H01M 10/6556* (2015.04); *H01M 10/6557* (2015.04); *F28F 2255/02* (2013.01); *H01M 10/6567* (2015.04)

(56) References Cited

U.S. PATENT DOCUMENTS

2014/0113171 A1* 4/2014 Schaefer ............ H01M 2/1077
429/120

FOREIGN PATENT DOCUMENTS

| DE | 102010055616 | 6/2012 |
|----|--------------|--------|
| EP | 0014249 | 8/1980 |
| GB | 873769 | 7/1961 |
| WO | 2012/130399 | 10/2012 |

* cited by examiner

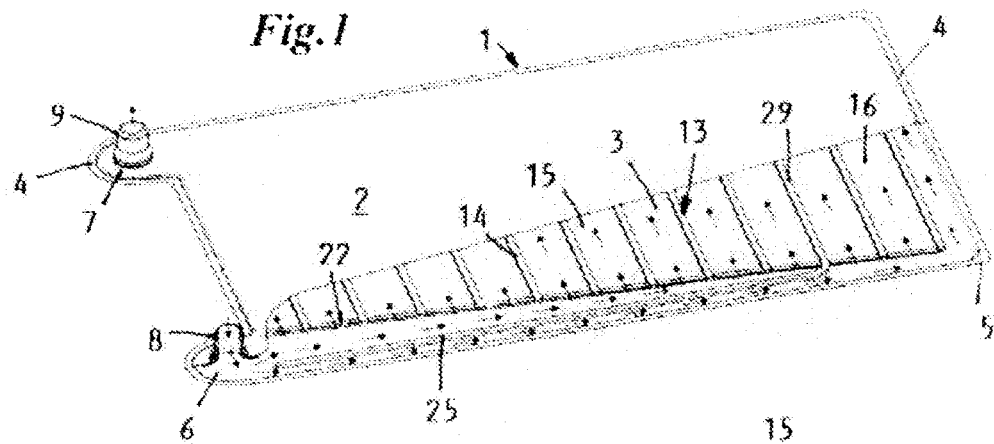
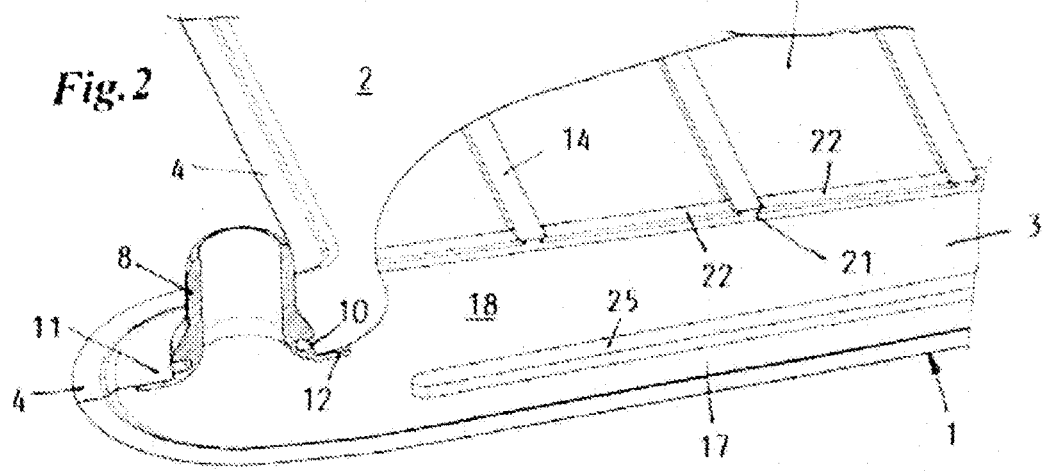
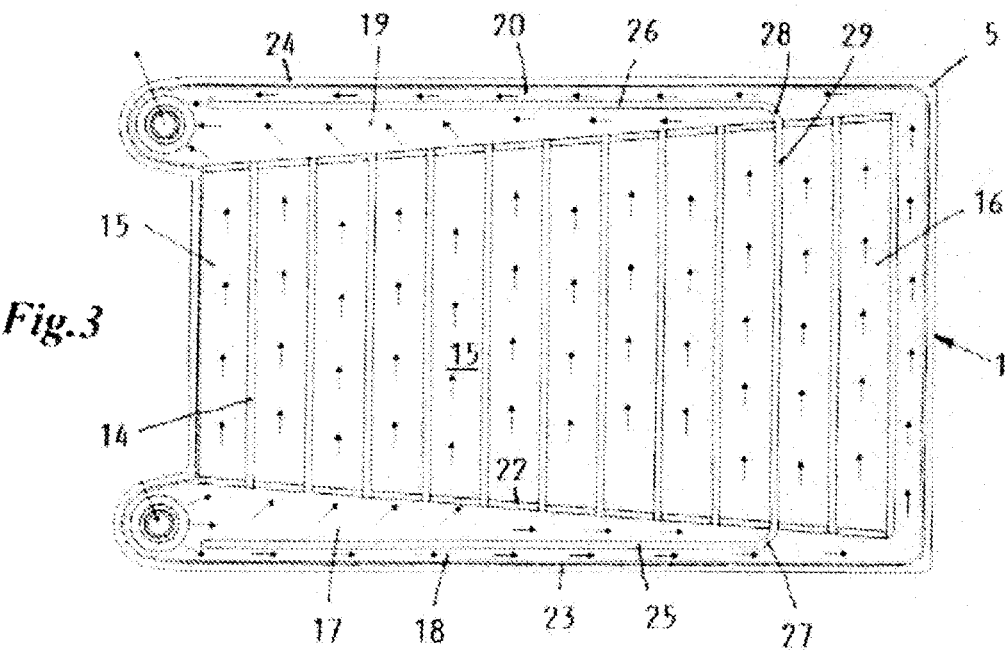

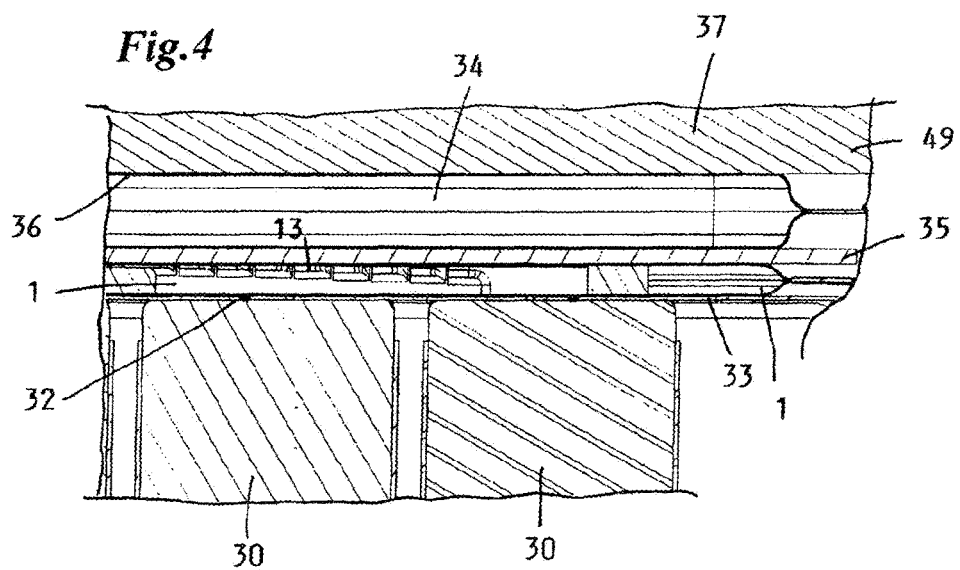
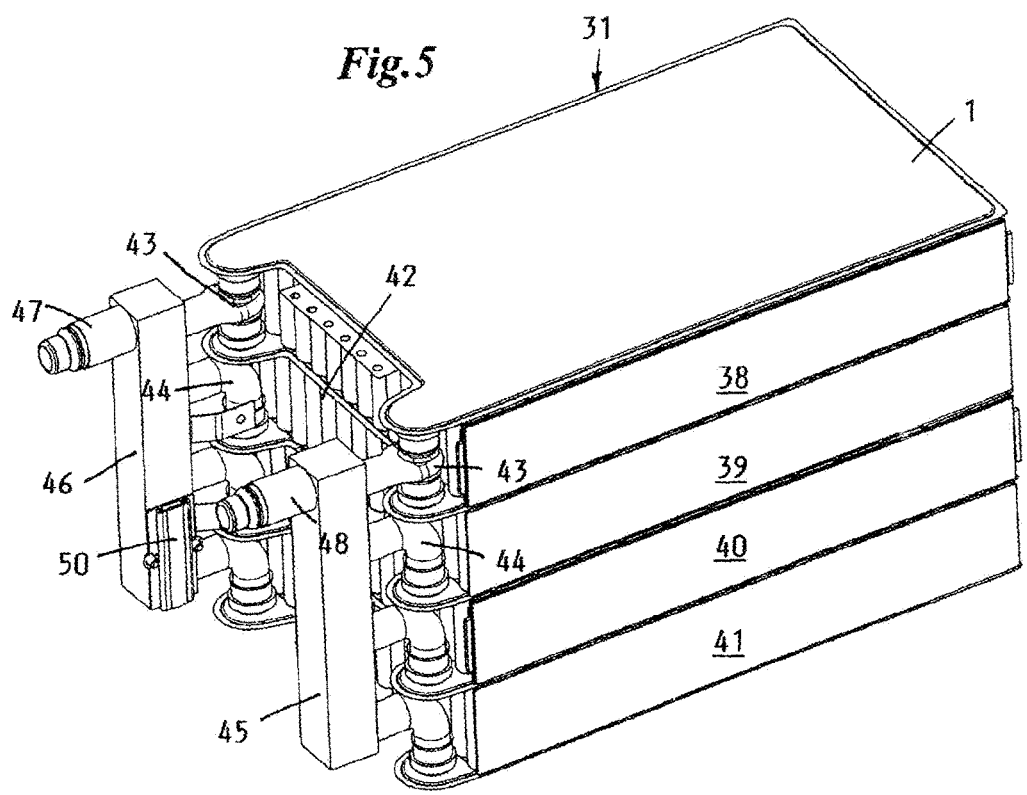

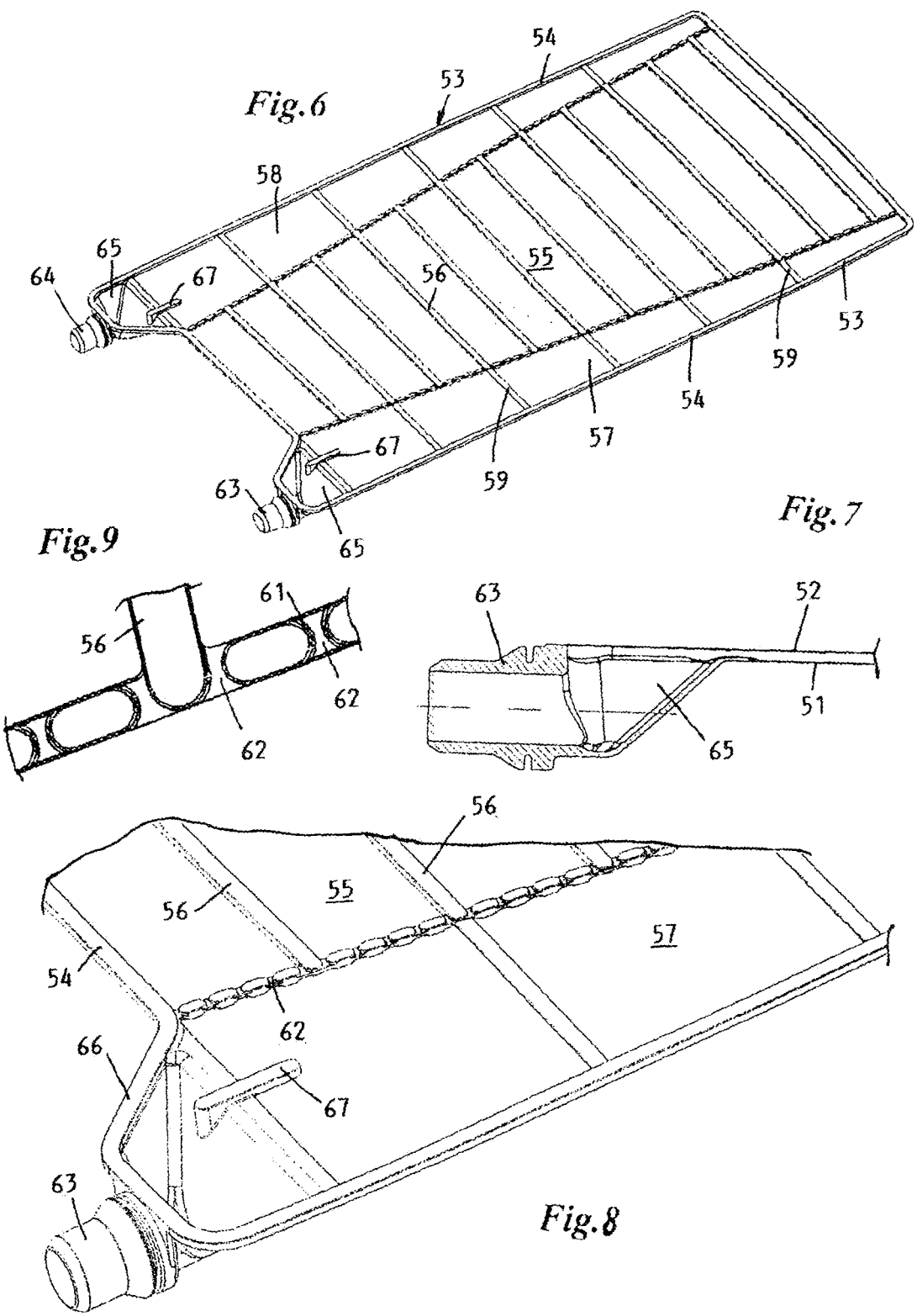

HEAT-EXCHANGER ASSEMBLY

CROSS-REFERENCE TO RELATED APPLICATIONS

This application claims priority to European application No. 12196196.5, filed Dec. 7, 2012, which is hereby incorporated by reference in its entirety.

BACKGROUND OF THE INVENTION

1. Field of the Invention

The invention relates to a heat exchanger arrangement of a technical object whose temperature is to be controlled, in particular of a battery for an electric vehicle drive, having a flat heat exchanger which has an inflow and outflow duct and which is traversed by a flow of a heat carrier medium, which heat exchanger is in heat-conducting contact with internal surfaces of the object whose temperature is to be controlled.

2. Description of the Related Art

DE102006059989 discloses a heat exchanger arrangement in which a structured cooling plate formed by pressure die casting is in heat-conducting contact with a hose-like cooling pipe and with heat-conducting elements protruding from said cooling pipe, which heat-conducting elements are in superficial contact with round cells of a battery for an electric vehicle drive.

DE102010055616 discloses a further heat exchanger arrangement of said type in which a solid cooling plate, which has individual internal ducts traversed by flow, is screwed to multiple solid frames which serve for holding pouch-like battery cells.

Said known heat exchanger arrangements illustrate the relatively great outlay required in terms of construction for producing ducts for conducting a heat carrier medium through a heat exchanger of flat form, and for producing heat-conducting contact with internal surfaces of an object whose temperature is to be controlled. Furthermore, a heat exchanger of said type takes up a relatively large amount of space in a corresponding arrangement, such that said heat exchanger contributes significantly to the structural size of the arrangement.

SUMMARY OF THE INVENTION

The invention is based on the object of finding a thermally highly effective heat exchanger arrangement of the stated type which takes up a relatively small structural volume and which can be produced and assembled in a particularly simple manner and inexpensively as a mass-produced product.

Said object is achieved according to the invention in that the heat exchanger is in the form of a heat-exchanging pouch formed from foil material, and in that, parallel thereto, there is arranged a pressure pouch which is filled with a compressible medium and which is formed from a foil material.

It is self-evident that a heat-exchanging pouch of said type can, by contrast to the plate-shaped metallic cast bodies of the cited prior art, be produced in a simple manner by being cut out or punched out of foil pieces in accordance with their desired shape and size, by being arranged so as to lie one on top of the other, and by being welded or adhesively bonded in the region of their edges. As a result of the flexible contact of said heat-exchanging pouch with heat-conducting internal surfaces of the object whose temperature is to be controlled, under the pressure exerted by the pressure pouch, said heat-exchanging pouch is supported with its internal pressure against said internal surfaces and can consequently accommodate a high pressure and flow rate of a heat carrier medium flowing through, and thus ensure a high quality of a transfer of heat by forced convection.

A heat-exchanging pouch of said type, owing to its low material and space requirement in relation to the size of its heat exchanger surfaces, is suitable for being inserted together with the hitherto still unfilled pressure pouch into a relatively narrow gap space, such that the technical object whose temperature is to be controlled can be produced with a correspondingly small structural size.

After the pressure pouch is filled with air or nitrogen and sealingly closed off, the heat-exchanging pouch lies firmly, under the fill pressure of the pressure pocket, against an internal surface of the object whose temperature is to be controlled, such that good conduction of heat to said object is ensured.

For a uniform distribution of the pressure exerted by the pressure pouch within the technical object, such as for example within the housing of a battery, it is provided in a preferred embodiment of the invention that a pressure distribution plate is arranged between the pressure pouch and the heat-exchanging pouch.

In a further advantageous embodiment of the invention, for a uniform flow distribution between the foil walls, a flow-guiding grate is enclosed between the foil walls of the heat-exchanging pouch.

BRIEF DESCRIPTION OF THE DRAWINGS

Further advantageous embodiments of the invention are specified in the dependent patent claims and emerge from the following description on the basis of the drawings, in which:

FIG. 1 is a perspective illustration of a heat-exchanging pouch of the heat exchanger arrangement according to the invention, with a sectional illustration in the region of an inflow connection, and a pouch wall being illustrated in partially cut-away form, FIG. 2 is an enlarged, partially sectional illustration of the inflow region of the heat-exchanging pouch as per FIG. 1, FIG. 3 shows a plan view of a part of the heat-exchanging pouch as per FIG. 1 without a second foil wall and with the flow distribution being indicated by arrows, FIG. 4 shows a partial cross section through a battery which has a heat exchanger arrangement according to the invention, FIG. 5 is a perspective illustration of multiple interconnected heat exchanger arrangements in a battery, FIG. 6 is a perspective illustration of the flow-guiding grate in a further embodiment of a heat-exchanging pouch, with connection nozzles formed integrally on said flow-guiding grate, FIG. 7 shows a partial cross section through a heat-exchanging pouch in the region of one of its connection nozzles, FIG. 8 shows an enlarged perspective partial illustration of the flow-guiding grate as per FIG. 6, in the region of a connection nozzle, and FIG. 9 shows an enlarged partial section in the plane of the heat-exchanging pouch and in the region of dam nozzles.

DETAILED DESCRIPTION OF THE INVENTION

The heat-exchanging pouch 1 of the heat exchanger arrangement according to the invention illustrated in FIG. 4 is composed of two thin walls 2, 3 which run parallel to one another, which are formed from a foil material and which are sealingly connected to one another in the region of their edges 4.

A suitable foil material for the production of the heat-exchanging pouch 1, in order to optimize its characteristics with regard to tear resistance, material durability, thermal conductivity, electrical insulation and weldability, is composed of a layered composite of different materials, such as, for example aluminum, polyamide, and polypropylene, and is commercially available with a foil thickness of less than 0.2 mm for various applications. If used for the cooling of a battery, at least one of the outer layers of the foil material should be composed of an electrically insulating plastics material, in order to render the arrangement of an additional electrically insulating foil unnecessary.

The heat-exchanging pouch 1 has, for example, a rectangular form with rounded corner regions 5 and, in the area of two corner regions situated opposite one another at a narrow side, connection regions 6, 7 which project in approximately semicircular form and which serve for the laterally external arrangement and fastening of in each case one connection nozzle 8, 9, oriented vertically with respect to the plane of the heat-exchanging pouch 1, for the supply and discharge, and thus circulation, of a heat carrier medium through the heat-exchanging pouch 1.

For the receiving and fastening of the connection nozzles 8, 9, in each case one circular opening 10 is punched out in the connection region 6, 7 of one of the walls 2, 3 of the heat-exchanging pouch 1. The wall region 11 surrounding said opening 10 bears, by way of its inner side, against a connecting flange 12 of the connection nozzle 8, 9 and is fixedly and sealingly connected to said connecting flange by welding or adhesive bonding.

In relation to the relatively small spacing between the walls 2, 3 of the heat-exchanging pouch 1, which spacing permits an adequate flow through the heat-exchanging pouch 1 and is preferably less than 2 mm, it is thus possible for the inner diameter, through which flow passes, of the connection nozzles 8, 9 to be configured so as to be relatively large, such that a correspondingly high delivery flow rate of the heat carrier medium can be realized, and consequently a particularly effective exchange of heat can be realized, with low temperature differences, within the heat-exchanging pouch 1.

For a flow distribution, which promotes the exchange of heat, of the flow through the heat-exchanging pouch 1 from the inflow connection nozzle 8 thereof to the outflow connection nozzle 9 thereof, a flow-guiding grate 13 is provided between the two walls 2, 3 of the heat-exchanging pouch 1, which flow-guiding grate is composed of interconnected flow-guiding webs which delimit longitudinally and transversely oriented flow paths, as indicated by directional arrows in FIG. 3.

In the illustrated exemplary embodiment, an inner grate composed of numerous, mutually parallel transverse webs 14 delimits transverse ducts 15, 16 which branch off from at least one inflow duct 17, 18 guided along the longitudinal edges of the heat-exchanging pouch 1 and which issue into at least one outflow duct 19, 20 guided along the opposite longitudinal edge.

A longitudinal web 21 which connects the transverse webs 14 to one another at their ends in ladder-shaped form has a smaller cross-sectional height than said transverse webs, such that those regions of the longitudinal web which extend between the transverse webs 14 form in each case one dam web 22. Consequently, the dam webs 22 generate a more uniform flow distribution through the transverse ducts 15 and 16 from the inflow duct 16 to the outflow duct 19, 20.

Furthermore, for uniform flow distribution, in each case one flow-dividing longitudinal web 25, 26 is provided which runs at least approximately parallel to the longitudinal edges 23, 24 of the heat-exchanging pouch 1 and which, in its outflow-side region, merges via a curvature 27, 28 into a dividing web 29. Said dividing web 29 delimits two groups of transverse ducts 15, on the one hand, and 16, on the other hand, from one another.

A flow-guiding grate 13 preferably designed in the described way can, in an inexpensive manner, be produced as an injection-molded part, for example from an aluminum alloy or from plastic, and, during the production of the heat-exchanging pouch 1, be placed between the foil walls 2, 3 of said pouch before said foil walls are welded to one another along the pocket edges 4. The flow-guiding grate 13 consequently forms, by way of its webs 14, 25-27 which are of equal height in cross section, an internal support which defines the distance of for example 2 mm between the pouch walls 2, 3. Such a support can absorb the areal pressure required for stable cohesion, for example of the components of a battery for a vehicle drive.

The illustration of FIG. 4 shows an exemplary embodiment which serves for controlling the temperature of numerous bar cells 30, which are arranged parallel to one another in the same plane and which are electrically connected to one another in parallel and in series, of a battery 31 for a vehicle drive. The heat conduction from the bar cells 30 to the heat-exchanging pouch 1 takes place here preferably via the end-side electrical contacts 32 thereof, for which purpose these are electrically connected to one another in parallel by means of a common contact plate 33, and the heat-exchanging pouch 1 bears in heat-conducting fashion against said contact plate 33.

In order that the heat-exchanging pouch 1 is pressed uniformly against the contact plate 33 and thus good heat-conducting contact is obtained and uniform pressure loading of the flow-guiding grate 13 enclosed therein is realized, a pressure pouch 34 is provided which is filled with a compressible medium, such as for example air or nitrogen, and a pressure distribution plate 35 provided between said pressure pouch and the heat-exchanging pouch 1 ensures a uniform transmission of pressure to the bar cells 30. In this way, it is ensured that said bar cells are provided with good temperature control and are held in a vibration-proof manner. Here, the pressure pouch 34 is supported, by way of its side averted from the heat-exchanging pouch 1, against the inner surface 36 of a wall 37 of a closed battery housing (not illustrated).

FIG. 5 shows an exemplary application of the invention for controlling the temperature of electrical bar cells 30 grouped in compact fashion in multiple layers 38-41 arranged one on top of the other, wherein in each case one heat-exchanging pouch 1 is provided between each mutually adjacent layer and also at the outside on the outer layers 38, 41. Consequently, the control of the temperature of the bar cells 31 is realized via a heat-conducting connection to the two contact ends thereof.

The connection nozzles 8, 9 provided on each of the mutually parallel heat-exchanging pouches 1 are provided one above the other on the same axis in the region of a face-end side surface 42 of the battery 31, and are connected via a T-shaped branch 43 or 90° elbow 44 to a common connection line 45, 46 running parallel to said side surface. Said connection lines 45, 46 form, via connection nozzles 47, 48 provided thereon, a connection to a circulation pump (not illustrated) and to an external heat exchanger (not illustrated).

When the battery 31, which includes for example lithium-ion cells, is under electrical load, the heat exchanger serves to dissipate the heat thereby generated in the battery cells 30.

A cooling action which may be detrimental to the battery cells 30 and to the performance thereof for example during operation in winter can preferably be prevented, in combination with a thermal insulation 49 of the battery, by means of a heating body 50 which is fastened to one of the connection lines 45, 46 and which is for example electrically operated by means of a thermostat switch.

In a second exemplary embodiment of a heat-exchanging pouch, the foil walls 51, 52 thereof including the edges of said foil walls are welded or adhesively bonded onto an inner supporting frame 53 which also serves as a flow-guiding grate, for which purpose said inner supporting frame additionally has an outer frame 54, which corresponds in terms of its size to the outer contour of the heat-exchanging pouch, and transverse webs 56, which delimit transverse flow ducts 55 and whose cross-sectional height corresponds to that of the outer frame 54. By contrast, the webs which extend outward as a continuation of the transverse webs 56 and transversely with respect to the longitudinal ducts 57, 58 form ridge-like dam webs 59.

To obtain a uniform flow through the heat-exchanging pouch by means of flow damming even in the case of the transverse flow running through the transverse flow ducts 55, it is provided that, corresponding to the illustrations in FIG. 8 and FIG. 9, in each case one row of rounded dam bodies 61 connected to one another by means of a web 60 is provided at the inflow side and at the outflow side, such that said dam bodies between them form a row of dam nozzles 62. The height of said dam nozzles 62 corresponds to that of the transverse webs 56 and of the outer frame 54. Consequently, the foil walls 51, 52 may additionally also be welded or adhesively bonded to said rows of dam bodies 61.

The connection nozzles 63, 64 of the heat-exchanging pouch may be integrally formed on the supporting frame 53 which is formed as a plastics injection-molded part. For this purpose, a trough-shaped duct piece 65 is formed between the planar supporting frame 53 and the cylindrical connection nozzles 63, 64, such that the edge 66 of said duct piece merges into the outer frame 54 in the same plane as the latter.

To stiffen the transition region between the two trough-shaped duct pieces 65 and the two connection pieces 63, 64, a rib 67 which extends in the flow direction and which thus also guides the flow may be formed on said transition region.

LIST OF REFERENCE SIGNS

1 Heat-exchanging pouch
2, 3 Thin walls
4 Edges
5 Corner region
6, 7 Connection regions
8, 9 Connection nozzles
10 Circular foil opening
11 Surrounding wall region
12 Connecting flange
13 Flow-guiding grate
14 Transverse webs
15, 16 Transverse ducts
17, 18 Inflow duct
19, 20 Outflow duct
21 Longitudinal web
22 Dam web
23, 24 Longitudinal edges
25, 26 Longitudinal web
27, 28 Curvature
29 Dividing web
30 Bar cell
31 Battery
32 Electrical contacts
33 Contact plate
34 Pressure pocket
35 Pressure distribution plate
36 Inner surface
37 Wall of the battery housing
38-41 Layers of bar cells
42 Side surface
43 T-branch
44 Elbow
45, 46 Connection lines
47, 48 Connection nozzles
49 Insulation
50 Heating body

The invention claimed is:

1. A heat exchanger arrangement for controlling a temperature of a technical object, the heat exchanger arrangement comprising:
    a supporting frame forming a flow-guiding grate;
    a flat heat exchanger
        being traversed by a flow of a heat carrier medium,
        being in heat-conducting contact with an internal surface of the object, and
        having a form of a heat-exchanging pouch, the heat-exchanging pouch being formed from a first foil material,
        comprising a plurality of flexible foil walls,
        comprising an inflow duct and an outflow duct,
        comprising an inflow connection nozzle associated with the inflow duct and an outflow connection nozzle associated with the outflow duct, and
    a pressure pouch
        being arranged parallel to the heat-exchanging pouch to achieve temperature control and a vibration-proof holding of the technical object,
        being filled with a compressible medium, and
        being formed from a second foil material;
    wherein the plurality of foil walls are welded or adhesively bonded to the supporting frame;
    wherein the supporting frame comprises an outer frame corresponding in size to an outer contour of the heat-exchanging pouch; and
    wherein the connection nozzles are formed integrally on the supporting frame.

2. The heat exchanger arrangement as claimed in claim 1, wherein a pressure distribution plate is arranged between the heat-exchanging pouch and the pressure pouch.

3. The heat exchanger arrangement as claimed in claim 1, wherein the flow-guiding grate is enclosed in the heat-exchanging pouch.

4. The heat exchanger arrangement as claimed in claim 3, wherein the flow-guiding grate comprises a flow-dividing longitudinal web, the flow-dividing longitudinal web
    being oriented substantially parallel to a longitudinal edge of the heat-exchanging pouch,
    having an inflow side web member directing an inflow of the heat carrier medium into the heat-exchanging pouch, and
    having an outflow side web member directing an outflow of the heat carrier medium from the heat exchanging pouch, the an outflow side web member parallel to the inflow side web member;

wherein the inflow side web member and the outflow side web member are connected to one another via the flow-dividing longitudinal web, the flow-dividing longitudinal web defining the inflow duct and the outflow duct.

5. The heat exchanger arrangement as claimed in claim 3, wherein the flow-guiding grate comprises a plurality of transverse webs, a longitudinal web connecting the plurality of transverse webs one another at respective ends of the transverse webs in ladder-shaped form, the longitudinal web having a smaller cross-sectional height than the transverse webs, wherein regions of the longitudinal web which extend between the transverse webs form in each case one dam web.

6. The heat exchanger arrangement as claimed in claim 1, wherein the inflow connection nozzle is sealingly disposed in a first hole in one of the foil walls, wherein the outflow connection nozzle is sealingly disposed in a second hole in the one of the foil walls, wherein the first hole and the second hole are spaced apart from each other, and wherein the inflow connection nozzle and the outflow connection nozzle are oriented perpendicularly to place of the heat-exchanging pouch.

7. The heat exchanger arrangement as claimed in claim 6, further comprising a seal between the one of the foil walls and a nozzle edge of the inflow connection nozzle or the outflow connection nozzle, wherein the seal comprises an adhesive bonding or a weld at the nozzle edge, and wherein the nozzle edge is integrally formed on the respect inflow connection nozzle or outflow connection nozzle and comprising a plate edge or a flange.

8. The heat exchanger arrangement as claimed in claim 1, further comprising a trough-shaped duct piece disposed between the supporting frame and the respect inflow connection nozzle or outflow connection nozzle, the duct piece comprising an edge disposed in a same plane as an outer frame of the supporting grate.

9. The heat exchanger arrangement as claimed in claim 1, wherein a row of dam bodies is provided at or downstream of transverse ducts of the heat-exchanging pouch.

10. The heat exchanger arrangement as claimed in claim 1, wherein a spacing between the foil walls of the heat-exchanging pouch is less than 2 mm.

11. The heat exchanger arrangement as claimed in claim 1, wherein the foil walls of the heat-exchanging pouch are less than 0.2 mm thick.

12. A battery for an electric vehicle drive, the battery comprising:

a plurality of bar cells;

a plurality of heat exchanger arrangements for controlling a temperature of the battery, each heat exchanger arrangement comprising:

a supporting frame forming a flow-guiding grate;

a flat heat exchanger being traversed by a flow of a heat carrier medium, being in heat-conducting contact with an internal surface of the object, and having a form of a heat-exchanging pouch, the heat-exchanging pouch being formed from a first foil material, comprising a plurality of flexible foil walls, comprising an inflow duct and an outflow duct, comprising an inflow connection nozzle associated with the inflow duct and an outflow connection nozzle associated with the outflow duct, and a pressure pouch being arranged parallel to the heat-exchanging pouch to achieve temperature control and a vibration-proof holding of the technical object, being filled with a compressible medium, and being formed from a second foil material;

wherein the plurality of foil walls are welded or adhesively bonded to the supporting frame;

wherein the supporting frame comprises an outer frame corresponding in size to an outer contour of the heat-exchanging pouch; and wherein the connection nozzles are formed integrally on the supporting frame;

wherein each bar cell comprises an end-side contact for connecting the respective bar cell electrically in parallel or in series with a second bar cell by a common contact plate, wherein one of the heat-exchanging pouch bears in heat-conducting fashion against at least two contact plates, wherein the first foil material of at least one of the foil walls of the heat-exchanging pouch facing toward the contact plates comprises multiple layers and having, on a side bearing against the contact plate, an electrically insulating layer.

13. The battery as claimed in claim 12, wherein the electrically interconnected bar cells are grouped in parallel with one another and in multiple layers arranged one above the other, and wherein one heat-exchanging pouch is provided between each of the adjoining layers and also on the outside on the outer layers.

14. The battery as claimed in claim 12, wherein the inflow connection nozzle and the outflow connection nozzle of a first heat-exchanger arrangement and a second heat-exchanger arrangement are disposed on a same axis in a region of a face-end side surface of the bar cells, and wherein the respective inflow connection nozzles or the respective outflow connection nozzles of the first heat-exchanger arrangement and the second heat-exchanger arrangement are connected via a T-shaped branch or 90.degre. elbow to a common connection line running parallel to the side surface.

15. The heat exchanger arrangement as claimed in claim 1, wherein the technical object is a battery.

* * * * *